United States Patent
Huang et al.

(10) Patent No.: US 8,433,736 B2
(45) Date of Patent: Apr. 30, 2013

(54) SCALABLE MONTGOMERY MULTIPLICATION ARCHITECTURE

(75) Inventors: Miaoqing Huang, Washington, DC (US); Krzysztof Gaj, Centreville, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 630 days.

(21) Appl. No.: 12/714,992

(22) Filed: Mar. 1, 2010

(65) Prior Publication Data

US 2010/0235414 A1  Sep. 16, 2010

Related U.S. Application Data

(60) Provisional application No. 61/156,068, filed on Feb. 27, 2009.

(51) Int. Cl.
*G06F 7/38* (2006.01)
*G06F 7/00* (2006.01)
*G06F 15/00* (2006.01)

(52) U.S. Cl.
USPC ........... 708/233; 708/200; 708/205; 708/207; 708/209; 708/503

(58) Field of Classification Search .................. None
See application file for complete search history.

(56) References Cited

U.S. PATENT DOCUMENTS

| | | | | |
|---|---|---|---|---|
| 2004/0010530 | A1* | 1/2004 | Freking et al. | 708/491 |
| 2004/0181567 | A1* | 9/2004 | Pappalardo et al. | 708/620 |
| 2005/0273485 | A1* | 12/2005 | Kershaw et al. | 708/700 |

* cited by examiner

*Primary Examiner* — Scott Sun
(74) *Attorney, Agent, or Firm* — David Grossman; Edgar Rodriguez

(57) ABSTRACT

A Montgomery multiplication device calculates a Montgomery product of an operand X and an operand Y with respect to a modulus M and includes a plurality of processing elements. In a first clock cycle, two intermediate partial sums are created by obtaining an input of length w−1 from a preceding processing element as w−1 least significant bits. The most significant bit is configured as either zero or one. Then, two partial sums are calculated using a word of the operand Y, a word of the modulus M, a bit of the operand X, and the two intermediate partial sums. In a second clock cycle, a selection bit is obtained from a subsequent processing element and one of the two partial sums is selected based on the value of the selection bit. Then, the selected partial sum is used for calculation of a word of the Montgomery product.

9 Claims, 19 Drawing Sheets

| Ordinary Domain | ⇔ | Montgomery Domain |
|---|---|---|
| $X$ | ↕ | $X' = X \cdot 2^n \pmod{M}$ |
| $Y$ | ↕ | $Y' = Y \cdot 2^n \pmod{M}$ |
| $XY$ | ↕ | $(X \cdot Y)' = X \cdot Y \cdot 2^n \pmod{M}$ |

Conversion between ordinary and Montgomery domains

FIG. 1 (Prior Art)

Process 1: Radix-2 Montgomery Multiplication

Input: odd $M, n = \lfloor \log_2 M \rfloor + 1, X = \sum_{i=0}^{n-1} x_i \cdot 2^i$, with
$0 \leq X, Y < M$
Output: $Z = MP(X, Y, M) \equiv X \cdot Y \cdot 2^{-n} \pmod{M}, 0 \leq Z < M$ 1.1 $S[0] = 0;$
1.2 for $i = 0$ to $n - 1$ step 1 do
1.3 $\quad q_i = (x_i \cdot Y_0) \oplus S[i]_0;$
1.4 $\quad S[i + 1] = (S[i] + x_i \cdot Y + q_i \cdot M)/2;$
1.5 if $S[n] > M$ then
1.6 $\quad S[n] = S[n] - M;$
1.7 return $Z = S[n];$

FIG. 2 (Prior Art)

Process 2: Multiple-Word Radix-2 Montgomery Multiplication Algorithm

Input: odd $M$, $n = \lfloor \log_2 M \rfloor + 1$, word size $w$, $e = \lceil \frac{n+1}{w} \rceil$,
$X = \sum_{i=0}^{n-1} x_i \cdot 2^i$, $Y = \sum_{j=0}^{e-1} Y^{(j)} \cdot 2^{w \cdot j}$,
$M = \sum_{j=0}^{e-1} M^{(j)} \cdot 2^{w \cdot j}$, with $0 \leq X, Y < M$ Output: $Z = \sum_{j=0}^{e-1} S^{(j)} \cdot 2^{w \cdot j} = MP(X, Y, M) \equiv X \cdot Y \cdot 2^{-n}$
$(\bmod M)$, $0 \leq Z < 2M$ 2.1   $S = 0$;      /*initialize all words of S*/
2.2   for $i = 0$ to $n - 1$ step 1 do
2.3    $q_i = (x_i \cdot Y_0^{(0)}) \oplus S_0^{(0)}$;
2.4    $(C^{(1)}, S^{(0)}) = x_i \cdot Y^{(0)} + q_i \cdot M^{(0)} + S^{(0)}$;
2.5    for $j = 1$ to $e$ step 1 do
2.6     $(C^{(j+1)}, S^{(j)}) = C^{(j)} + x_i \cdot Y^{(j)} + q_i \cdot M^{(j)} + S^{(j)}$;
2.7     $S^{(j-1)} = (S_0^{(j)}, S_{w-1..1}^{(j-1)})$;
2.8    $s^{(e)} = 0$;
2.9   return $Z = S$;

FIG. 3 (Prior Art)

Process 3: Computations in Task D

Input: $x_i, Y^{(0)}, M^{(0)}, S_0^{(1)}, S_{w-1..1}^{(0)}$

Output: $q_i, C^{(1)}, S_{w-1..1}^{(0)}$ 3.1  $q_i = (x_i \cdot Y_0^{(0)}) \oplus S_1^{(0)}$;

3.2  $(CO^{(1)}, SO_{w-1}^{(0)}, S_{w-2..0}^{(0)}) = (1, S_{w-1..1}^{(0)}) + x_i \cdot Y^{(0)} + q_i \cdot M^{(0)}$;

3.3  $(CE^{(1)}, SE_{w-1}^{(0)}, S_{w-2..0}^{(0)}) = (0, S_{w-1..1}^{(0)}) + x_i \cdot Y^{(0)} + q_i \cdot M^{(0)}$;

3.4  if $S_0^{(1)} = 1$ then

3.5  $\quad C^{(1)} = CO^{(1)}$;

3.6  $\quad S_{w-1..1}^{(0)} = (SO_{w-1}^{(0)}, S_{w-2..1}^{(0)})$;

3.7  else

3.8  $\quad C^{(1)} = CE^{(1)}$;

3.9  $\quad S_{w-1..1}^{(0)} = (SE_{w-1}^{(0)}, S_{w-2..1}^{(0)})$;

FIG. 11

| Process 4: Computations in Task E |
|---|

Input: $q_h$, $x_i$, $C(j)$, $Y(j)$, $M(j)$, $S_0^{(j+1)}$, $S_{w-1,1}^{(j)}$
Output: $C(j+1)$, $SO_{w-1,1}^{(j)}$, $S_0^{(j)}$ 4.1  $(CO(j+1), SO_{w-1,1}^{(j)}, S_{w-2,0}^{(j)}) =$
     $(1, S_{w-1,1}^{(j)}, S_0^{(j)}) + C(j) + x_i \cdot Y(j) + q_h \cdot M(j);$
4.2  $(CE(j+1), SE_{w-1,1}^{(j)}, S_{w-2,0}^{(j)}) =$
     $(0, S_{w-1,1}^{(j)}) + C(j) + x_i \cdot Y(j) + q_h \cdot M(j);$
4.3  if $S_0^{(j+1)} = 1$ then
4.4  $\quad C(j+1) = CO(j+1);$
4.5  $\quad S_{w-1,1}^{(j)} = (SO_{w-1,1}^{(j)}, S_{w-2,1}^{(j)});$
4.6  else
4.7  $\quad C(j+1) = CE(j+1);$
4.8  $\quad S_{w-1,1}^{(j)} = (SE_{w-1,1}^{(j)}, S_{w-2,1}^{(j)});$

FIG. 12

Process 5: Computations in Task F

Input: $q_3, x_3, C^{(e-1)}, Y^{(e-1)}, M^{(e-1)}, S_{w-1..1}^{(e-1)}, C_0^{(e)}$
Output: $C^{(e)}, S_{w-1..1}^{(e)}, S_0^{(e-1)}$ 5.1 $(C^{(e)}, S^{(e-1)}) =$
$(C_0^{(e)}, S_{w-1..1}^{(e-1)}) + C^{(e-1)} + x_3 \cdot Y^{(e-1)} + q_3 \cdot M^{(e-1)};$

FIG. 13

Process 6: Multiple-Word Radix-4 Montgomery Multiplication Algorithm

Input: odd $M$, $n = \lfloor \log_2 M \rfloor + 1$, word size $w$, $e = \lceil \frac{n+1}{w} \rceil$,
$X = \sum_{i=0}^{\lceil \frac{n}{2} \rceil - 1} x^{(i)} \cdot 4^i$, $Y = \sum_{j=0}^{e-1} Y^{(j)} \cdot 2^{w \cdot j}$,
$M = \sum_{j=0}^{e-1} M^{(j)} \cdot 2^{w \cdot j}$, with $0 \leq X, Y < M$ Output: $Z = \sum_{j=0}^{e-1} S^{(j)} \cdot 2^{w \cdot j} = MP(X, Y, M) \equiv X \cdot Y \cdot 2^{-n}$
$\pmod{M}$, $0 \leq Z < 2M$ 6.1 $S = 0$; /*initialize all words of $S$*/
6.2 for $i = 0$ to $n-1$ step 2 do
6.3 $\quad q^{(i)} = Func(S_{1..0}^{(0)}, x^{(i)}, Y_{1..0}^{(0)}, M_{1..0}^{(0)})$; /*$q^{(i)}$ and $x^{(i)}$ are 2-bit long*/
6.4 $\quad (C^{(1)}, S^{(0)}) = S^{(0)} + x^{(i)} \cdot Y^{(0)} + q^{(i)} \cdot M^{(0)}$; /*$C$ is 3-bit long*/
6.5 $\quad$ for $j = 1$ to $e-1$ step 1 do
6.6 $\quad\quad (C^{(j+1)}, S^{(j)}) = C^{(j)} + S^{(j)} + x^{(i)} \cdot Y^{(j)} + q^{(i)} \cdot M^{(j)}$;
6.7 $\quad\quad S^{(j-1)} = (S_{1..0}^{(j)}, S_{w-1..2}^{(j-1)})$;
6.8 $\quad S^{(e-1)} = (C_{1..0}^{(e)}, S_{w-1..2}^{(e-1)})$;
6.9 return $Z = S$;

FIG. 18

SCALABLE MONTGOMERY MULTIPLICATION ARCHITECTURE

CROSS-REFERENCE TO RELATED APPLICATIONS

This application claims the benefit of U.S. Provisional Application No. 61/156,068, filed Feb. 27, 2009, entitled "A Scalable Montgomery Multiplication Hardware Architecture," which is hereby incorporated by reference in its entirety.

BACKGROUND

Montgomery modular multiplication is one of the fundamental operations used in cryptographic processes, such as Rivest, Shamir and Adleman (RSA) and Elliptic Curve Cryptosystems. Since the introduction of the RSA process in 1978, high-speed and space-efficient hardware architectures for modular multiplication have been a subject of constant interest for almost 30 years. During this period, one of the most useful advances came with the introduction of the Montgomery multiplication process due to Peter L. Montgomery. Montgomery multiplication is a basic operation of modular exponentiation, which may be used in the RSA public-key cryptosystem. It may also be used in Elliptic Curve Cryptosystems, and several methods of factoring, such as Elliptic Curve Method (ECM), p−1, and Pollard's "rho" method, as well as in many other cryptographic and cryptanalytic transformations.

BRIEF DESCRIPTION OF THE SEVERAL VIEWS OF THE DRAWINGS

FIG. 1 is a table presenting conversion between ordinary and Montgomery domains.

FIG. 2 shows pseudocode for a Radix-2 Montgomery Multiplication process.

FIG. 3 shows a pseudocode for a multiple-word Radix-2 Montgomery Multiplication process.

FIG. 11 is a pseudocode for computations in Task D as per an aspect of an embodiment of the present invention.

FIG. 12 is a pseudocode for computations in Task E as per an aspect of an embodiment of the present invention.

FIG. 13 is a pseudocode for computations in Task F as per an aspect of an embodiment of the present invention.

FIG. 18 is a pseudocode for a multiple-word Radix-4 Montgomery Multiplication process as per an aspect of an embodiment of the present invention.

DETAILED DESCRIPTION OF EMBODIMENTS

Figure 4:
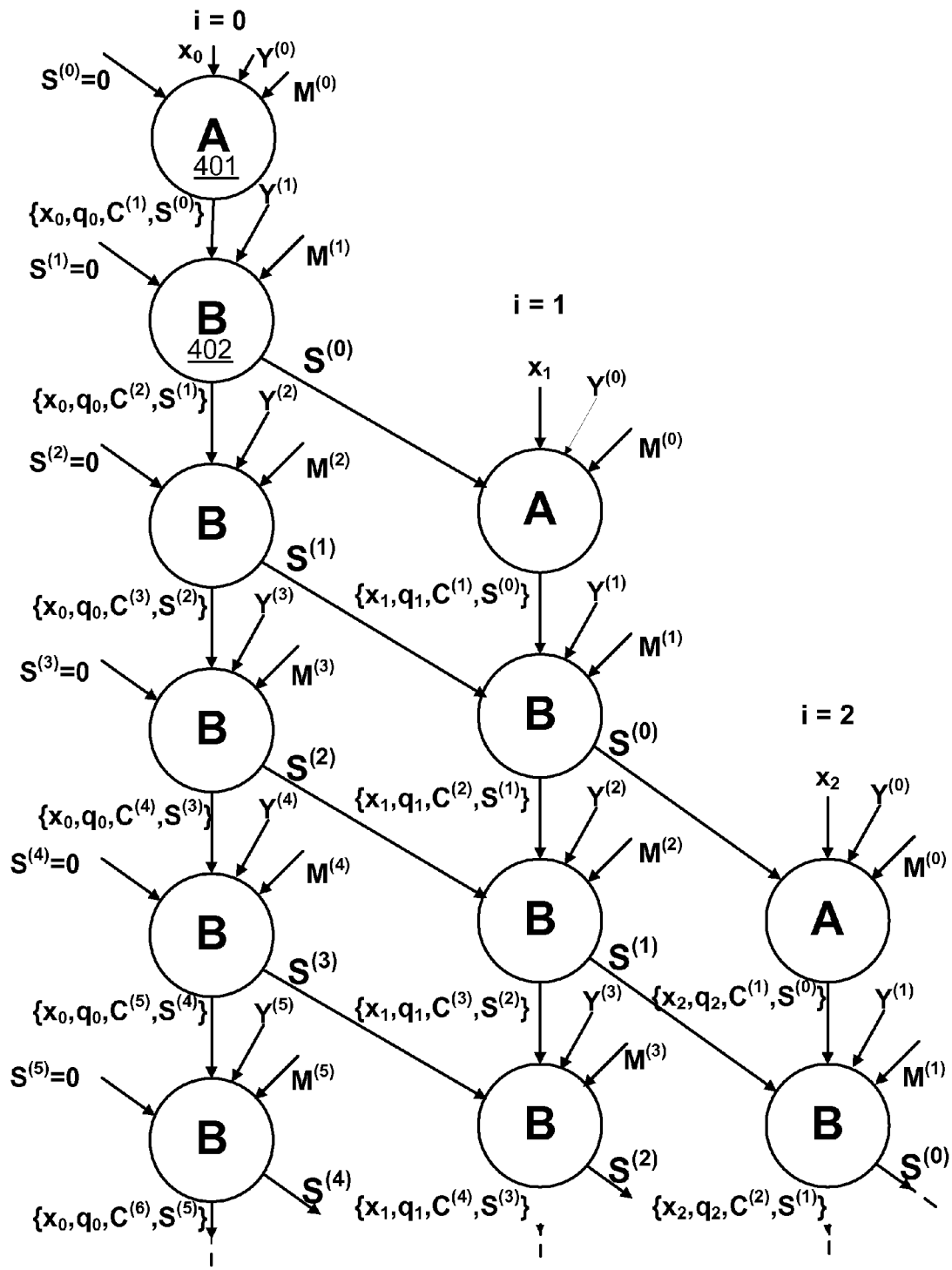
FIG. 4 is a data dependency graph of an original architecture of MWR2MM process.

Embodiments of the present invention implement a scalable Montgomery modular multiplication between an operand X and an operand Y with a modulus M.

Montgomery multiplication is presented as X·Y (mod M), assuming M>0 and M being an odd integer. In many cryptosystems, such as RSA, computing X·Y (mod M) is a crucial operation. The reduction of X·Y (mod M) is a more time-consuming action than the multiplication X·Y without reduction. Montgomery introduced a method for calculating products (mod M) without the costly reduction (mod M). This has since been known as Montgomery multiplication. Montgomery multiplication of X and Y (mod M), denoted by MP(X, Y, M), is defined as $X \cdot Y \cdot 2^{-n}$ (mod M) for some fixed integer n.

Since Montgomery multiplication is not an ordinary multiplication, there is a conversion process between the ordinary domain (with ordinary multiplication) and the Montgomery domain. FIG. 1 is a table presenting conversion between ordinary and Montgomery domains. The conversion between the ordinary domain and the Montgomery domain is given by the relation X<−>X', where X'=X·2$^n$ (mod M).

FIG. 1 shows that the conversion is compatible with multiplications in each domain, since $$MP(X',Y',M) \equiv X' \cdot Y' \cdot 2^{-n} \equiv (X \cdot 2^n) \cdot (Y \cdot 2^n) \cdot 2^{-n} \equiv X \cdot Y \cdot 2^n \equiv (X \cdot Y)' \quad (1)$$

The conversion between each domain could be done using the same Montgomery operation, in particular X'=MP(X, $2^{2n}$ (mod M), M) and X=MP(X', 1, M), where $2^{2n}$ (mod M) could be precomputed. Despite the initial conversion cost, an advantage is achieved over ordinary multiplication if many Montgomery multiplications are performed followed by an inverse conversion at the end, such as the scenario in RSA.

Process 1 in FIG. 2 is a pseudocode for Radix-2 Montgomery Multiplication process. In Process 1, n=⌊log$_2$ M⌋+1, wherein n is the precision of M. The verification of Process 1 is given below: S[i] is defined as:

$$S[i] \equiv \frac{1}{2^i} \left( \sum_{j=0}^{i-1} x_j \cdot 2^j \right) \cdot Y \; (\text{Mod } M) \quad (2)$$

with S[0]=0. Then, $S[n]=X \cdot Y \cdot 2^{-n}$ (mod M)=MP(X,Y,M). S[n] can be computed iteratively using the following dependence:

$$S[i+1] \equiv \frac{1}{2^{i+1}} \left( \sum_{j=0}^{i} x_j \cdot 2^j \right) \cdot Y \quad (3)$$

$$\equiv \frac{1}{2^{i+1}} \left( \sum_{j=0}^{i-1} x_j \cdot 2^j + x_i \cdot 2^i \right) \cdot Y$$

$$\equiv \frac{1}{2} \left( \frac{1}{2^i} \left( \sum_{j=0}^{i-1} x_j \cdot 2^j \right) \cdot Y + x_i \cdot Y \right)$$

$$\equiv \frac{1}{2} (S[i] + x_i \cdot Y) \; (\mathrm{mod}\, M).$$

Therefore, S[i+1] depends on the parity of $S[i]+x_i \cdot Y$. In order to make the numerator divisible by 2, S[i+1] may be computed as $$S[i+1] = \frac{S[i]+x_i \cdot Y}{2} \text{ or } \frac{S[i]+x_i \cdot Y + M}{2} \quad (4)$$

Since Y<M and S[0]=0, it may be concluded that $0 \leq S[i] < 2M$ for all $0 \leq i \leq n$. The result of a Montgomery multiplication $X \cdot Y \cdot 2^{-n}$ (mod M)<2M when X,Y<2M and $2^n>4M$. As a result, by redefining n to be the smallest integer such that $2^n>4M$, the subtraction at the end of Process 1 can be avoided and the output of the multiplication directly used as an input for the next Montgomery multiplication.

A word-based process for Montgomery multiplication, called Multiple-Word Radix-2 Montgomery Multiplication (MWR2MM), as well as a scalable hardware architecture capable of executing this process was introduced in the article authored by A. F. Tenca and C. K. Koc., entitled "A scalable architecture for Montgomery multiplication," and published in CHES '99, Springer-Verlag Lecture Notes in Computer Sciences, vol. 1717, 1999, pp. 94-108. Several follow-up designs based on the MWR2MM process have been proposed in order to reduce the computation time. The embodiments of this invention focus on the optimization of hardware architectures for MWR2MM and MWR4MM processes in order to minimize the number of clock cycles required to compute an n-bit precision Montgomery multiplication. Process 2 in FIG. 3 is a pseudocode for multiple-word Radix-2 Montgomery Multiplication process as presented by Tenca and Koc.

In Process 2, the operand Y (multiplicand) is scanned word-by-word, and the operand X is scanned bit-by-bit. The operand length is n bits, and the word-length is w bits.

$$e = \left\lceil \frac{n+1}{w} \right\rceil$$

words are required to store S since its range is [0, 2M−1]. The original M and Y are extended by one extra bit of 0 as the most significant bit. M, Y, S, and X may be presented as vectors, $M=(0, M^{(e-1)}, \ldots, M^{(1)}, M^{(0)})$, $Y=(0, Y^{(e-1)}, \ldots, Y^{(1)}, Y^{(0)})$, $S=(0, S^{(e-1)}, \ldots, S^{(1)}, S^{(0)})$, and $X=(x_{n-1}, \ldots, x_1, x_0)$. The carry variable $C^{(j)}$ has two bits, as explained below. Assuming $C^{(0)}=0$, each subsequent value of $C^{(j+1)}$ is given by $(C^{(j+1)}, S^{(j)})=C^{(j)}+x_i \cdot Y^{(j)}+q_i \cdot M^{(j)}+S^{(j)}$.

If $C^{(j)} \leq 3$ is assumed, then the following may be obtained:

$$(C^{(j+1)}, S^{(j)}) = C^{(j)} + x_i \cdot Y^{(j)} + q_i \cdot M^{(j)} + S^{(j)} \quad (5)$$

$$\leq 3 + 3 \cdot (2^w - 1)$$

$$= 3 \cdot 2^w.$$

From (5), $C^{(j+1)} \leq 3$ may be concluded. By induction, $C^{(j)} \leq 3$ is ensured for any $0 \leq j \leq e-1$. Additionally, based on the fact that $S \leq 2M$, it is concluded that $C(e) \leq 1$.

FIG. 4 is a data dependency graph of the original architecture of MWR2MM process. Each circle in the graph represents an atomic computation and is labeled according to the type of action performed. Task A 401 includes computing lines 2.3 and 2.4 in Process 2. Task B 402 corresponds to computing lines 2.6 and 2.7 in Process 2.

Figure 5:
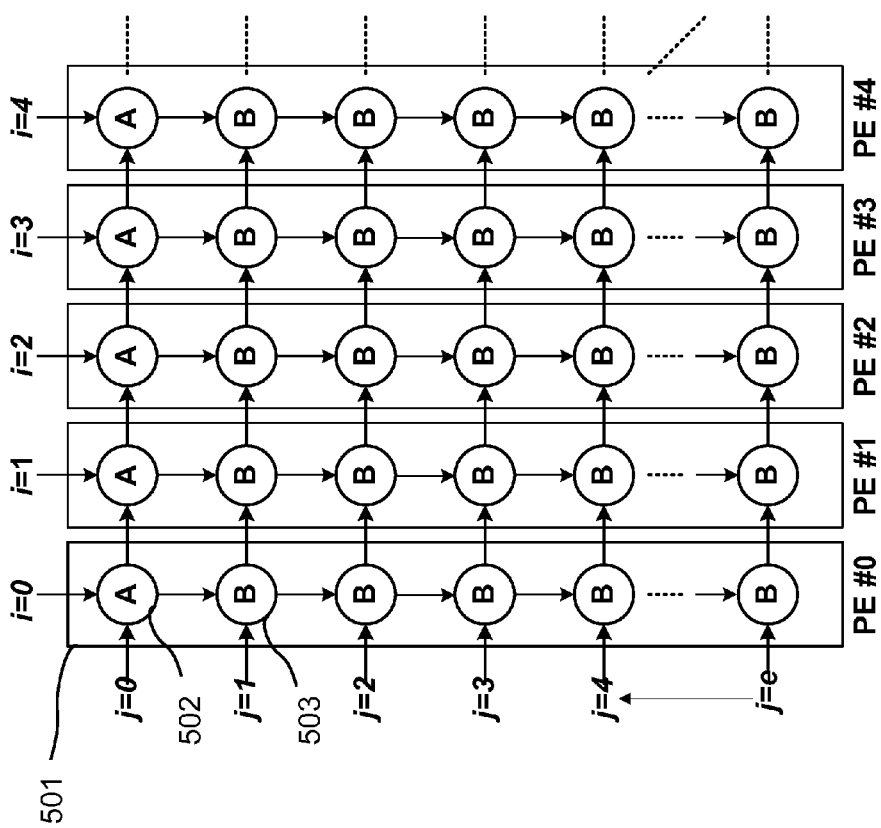
FIG. 5 is an illustration showing the mapping of an MWR2MM process to processing elements.

The data dependencies among the operations within the j loop make it impossible to execute the actions in a single iteration of the j loop in parallel. However, parallelism is possible among executions of different iterations of the i loop. Tenca and Koc suggested that each column in the graph may be computed by a separate processing element (PE), and the data generated from one PE may be passed into another PE in a pipelined fashion. FIG. 5 is an illustration showing the mapping of MWR2MM process to processing elements. Each processing element 501 may perform one task A 502 and e task B 503. Following this method, all atomic computations represented by circles in the same row could be processed concurrently. The processing of each column takes e+1 clock cycles (1 clock cycle for Task A 502, e clock cycles for Task B 503). Because there is a delay of 2 clock cycles between the processing of a column for $x_i$ and the processing of a column for $x_{i+1}$, the minimum computation time T (in clock cycles) is T=2n+e−1 given $$P_{max} = \left\lceil \frac{e+1}{2} \right\rceil$$

PEs are implemented to work in parallel. In this configuration, after e+1 clock cycles, PE #0 switches from executing column 0 to executing column $P_{max}$. After another two clock cycles, PE #1 switches from executing column 1 to executing column $P_{max}+1$, etc. With parameters optimized for minimum latency, this architecture performs a single Montgomery multiplication in approximately 2n clock cycles, where n is the size of operands in bits.

The opportunity of improving the implementation performance of Process 2 is to reduce the delay between the processing of two subsequent iterations of i loop from 2 clock cycles to 1 clock cycle. The 2-clock cycle delay comes from the right shift (division by 2) in both Process 1 and 2. Take the first two PEs in FIG. 4 for example. These two PEs compute the S words in the first two columns. Starting from clock #0, PE #1 has to wait for two clock cycles before it starts the computation of $S^{(0)}(i=1)$ in clock #2.

In this disclosure, embodiments of a new scalable architecture are presented for Montgomery multiplication. The architecture utilizes parallelism by precomputing partial results using two different assumptions regarding the most significant bit of each partial result word.

An embodiment includes a scalable Montgomery multiplication process for obtaining a Montgomery product of an operand X and an operand Y with respect to a modulus M. The Montgomery multiplication device 1700 has a plurality of processing elements (PEs), which are interconnected in sequence. The processing elements include a first processing element 1703, at least one intermediate processing element 1704, and a last processing element 1705. The first PE performs task D, the intermediate PE performs task E, and the last PE performs task F. Each word of the Montgomery product is calculated by the first PE, an intermediate PE or the last PE. Operands X and Y and the modulus M may be assumed to be n bits each, and $$e = \left\lceil \frac{n+1}{w} \right\rceil.$$

The Montgomery multiplication process in each PE comprises many modules. First, a word length w and a number of words e may be selected. The operand Y and the modulus M may be scanned as e words of length w, wherein e is at least 2. The operand X may be scanned as n bits.

In a first clock cycle of processing elements, a first intermediate partial sums and a second intermediate partial sums may be created. The first intermediate partial sum of length w may be created by obtaining an input of length w−1 from a preceding processing element as w−1 least significant bits of the first intermediate partial sum 602. The most significant bit of the first intermediate partial sum is configured as zero 603. The second intermediate partial sum of length w may be created by obtaining the same input of length w−1 from the same preceding processing element as the w−1 least significant bits of the second intermediate partial sum. The most significant bit of the second intermediate partial sum is configured as one 604.

Figure 6:
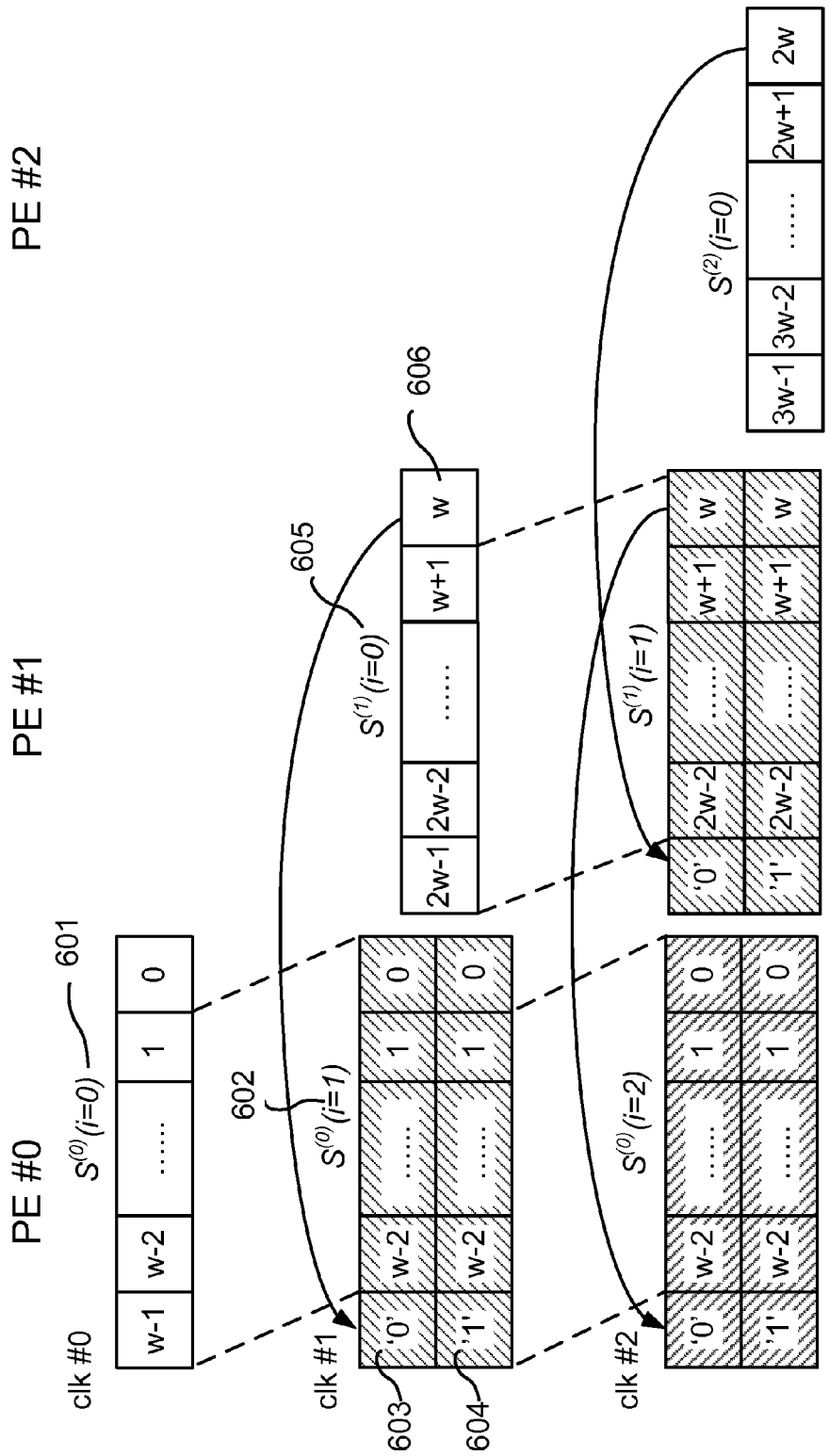
FIG. 6 is a diagram depicting a data operation in an architecture according to an aspect of an embodiment of the present invention.

A first partial sum and a second partial sum may be created (as shown in FIG. 6) using at least a word of the operand Y, a word of the modulus M, a bit of the first operand X, and the first intermediate partial sum and second intermediate partial sum respectively. Calculation of the first partial sum and the second partial sum further includes a one-bit carrier or a two-bit carrier. These calculations may be performed by the processing elements.

In a second clock cycle of processing elements, a selection bit (1708 in FIG. 17 and 606 in FIG. 6) may be obtained from the subsequent processing element. Either the first partial sum or the second partial sum is selected as the selected partial sum based on the value of the selection bit. The selected partial sum may be used for calculation of a word of the Montgomery product. The selection bit may be the least significant bit of a partial sum calculated in the subsequent processing element.

The Montgomery product may be calculated iteratively. The operand X may be processed iteratively bit-by-bit and the operand Y is processed iteratively word-by-word.

Another aspect of the present embodiment includes a Montgomery multiplication process for obtaining a Montgomery product of an operand X and an operand Y with respect to a modulus M. The Montgomery multiplication device 1700 has a plurality of processing elements (PEs), which are interconnected in sequence. The processing elements include a first processing element 1703, at least one intermediate processing element 1704, and a last processing element 1705. First, a word length w and a number of words e may be selected. The operand Y and the modulus M may be scanned as e words of length w, wherein e is at least 2. The operand X may be scanned as n bits.

The Montgomery multiplication process may obtain the first word of the Montgomery product by the first processing element using at least the first word of the operand Y, the first word of the modulus M, a bit of the operand X, and a partial sum calculated in the first processing element.

The Montgomery multiplication process may obtain an intermediate word of the Montgomery product by an intermediate processing element using at least an intermediate word of operand Y, an intermediate word of modulus M, and a bit of the operand X, and a partial sum calculated in the intermediate processing element.

The Montgomery multiplication process may obtain the last word of the Montgomery product by the last processing element using at least the last word of the second operand Y, the last word of the modulus M, a bit of the operand X, and a partial sum calculated in the last processing element.

Further aspects of the present embodiment include a Montgomery multiplication device 1700 for obtaining a Montgomery product of an operand X and an operand Y with respect to a modulus M. The Montgomery multiplication device comprises a first shift register 1702, a second shift register 1701, a first processing element 1703, at least one intermediate processing element 1704, and a last processing element 1705.

The first shift register may include an operand input 1714 and a multitude of the operand X bit outputs (for example 1711). The operand input 1714 may receive the operand X. Each of the multitudes of the operand X bit outputs may output progressively shifted operand X bits. The second shift register may include a parity input 1715 and a multitude of parity outputs (for example 1712). The parity input 1715 may receive a parity bit. Each of the multitudes of parity outputs may be a progressive shifted parity bit.

The first processing element 1703 performs task D. The first processing element may include a first Y operand input, a first modulus input, a first partial sum input, a first carry output, a first partial sum output, a first operand X input, and a first parity output. The first Y operand input may receive the first word of the operand Y. The first modulus input may receive the first word of a modulus M. The first partial sum input may receive the least significant bit of the second word of a partial sum. The first carry output may output a first carry. The first partial sum output may output the least significant word of the partial sum. The operand X input may receive the first bit of the progressively shifted operand X bits from the multitude of operand X bit outputs. The first parity output may output the parity bit to the parity input.

At least one intermediate processing element 1704 performs task E. The intermediate processing element may include an intermediate Y operand input 1713, an intermediate modulus input 1712, an intermediate partial sum input bit 1708, an intermediate carry output 1709, an intermediate partial sum output 1710, an intermediate operand X input 1711, an intermediate partial sum output bit 1706, an intermediate carry input 1707 and an intermediate parity input 1712. The intermediate Y operand input 1713 may receive an intermediate word of the operand Y. The intermediate modulus input 1712 may receive an intermediate word of the modulus M. The intermediate partial sum input bit 1708 may receive the least significant bit of an intermediate word of the partial sum. The intermediate carry output 1709 may output a first intermediate carry. The intermediate partial sum output 1710 may output an intermediate word of the partial sum. The intermediate operand X input 1711 may receive an intermediate progressively shifted first operand X bit from the multitude of first operand X bit outputs. The intermediate partial sum output bit 1706 may output the least significant bit of an intermediate word of the partial sum. The intermediate carry input 1707 may receive a second intermediate carry. The intermediate parity input 1712 may receive a parity bit from one of the multitude of parity outputs.

The last processing element 1705 performs task F. The last processing element may include a last Y operand input, a last modulus input, a last partial sum output, a last operand X input, a last partial sum input, a last carry input, and a last parity input. The last Y operand input may receive a last word of the operand Y. The last modulus input may receive a last word of the modulus M. The last partial sum output may output the last word of the partial sum. The last operand X input may receive the last progressively shifted first operand X bit from the multitude of first operand X bit outputs. The last partial sum output bit may output the least significant bit of the last word of the partial sum. The last carry input may receive an intermediate carry. The last parity input may receive a parity bit from the last of the multitude of parity outputs.

Alternative embodiments are now described in more detail. In order to reduce the 2-clock-cycle delay to half, an approach is presented in this embodiment. The embodiment pre-computes the partial results using two possible assumptions regarding the most significant bit of the previous word. FIG. 6 is a depiction of data operation in the architecture. FIG. 6 demonstrates the computations of the first 3 PEs in the first 3 clock cycles.

As shown in FIG. 6, PE #0 may take the w−1 most significant bits of $S^{(0)}(i=0)$ 601 from PE #0 previous calculations at the beginning of clock #1, do a right shift, and compute two versions of $S^{(0)}(i=1)$ 602, based on the two different assumptions about the most significant bit of this word at the start of computations. The first computation assumes the most significant bit is zero 603 and the second computation assumes the most significant bit is one 604. At the beginning of the clock cycle #2, the previously missing bit may become available as the least significant bit of $S^{(1)}(i=0)$ 605. This bit 606 can be used to choose between the two precomputed versions of $S^{(0)}(i=1)$ 602. Similarly, in the clock cycle #2, two different versions of $S^{(0)}(i=2)$ and $S^{(1)}(i=1)$ may be computed by PE #0 and PE #1 respectively, based on two different assumptions about the most significant bits of these words at the start of computations. At the beginning of the clock cycle #3, the previously missing bits become available as the least significant bits of $S^{(1)}(i=1)$ and $S^{(2)}(i=0)$, respectively. These two bits could be used to choose between the two precomputed versions of these words. The same pattern of computations may be repeated in subsequent clock cycles. Furthermore, since e words are enough to represent the values in S, S(e) may be discarded in this design. Therefore, e clock cycles are required to compute one iteration of S.

Figure 7:
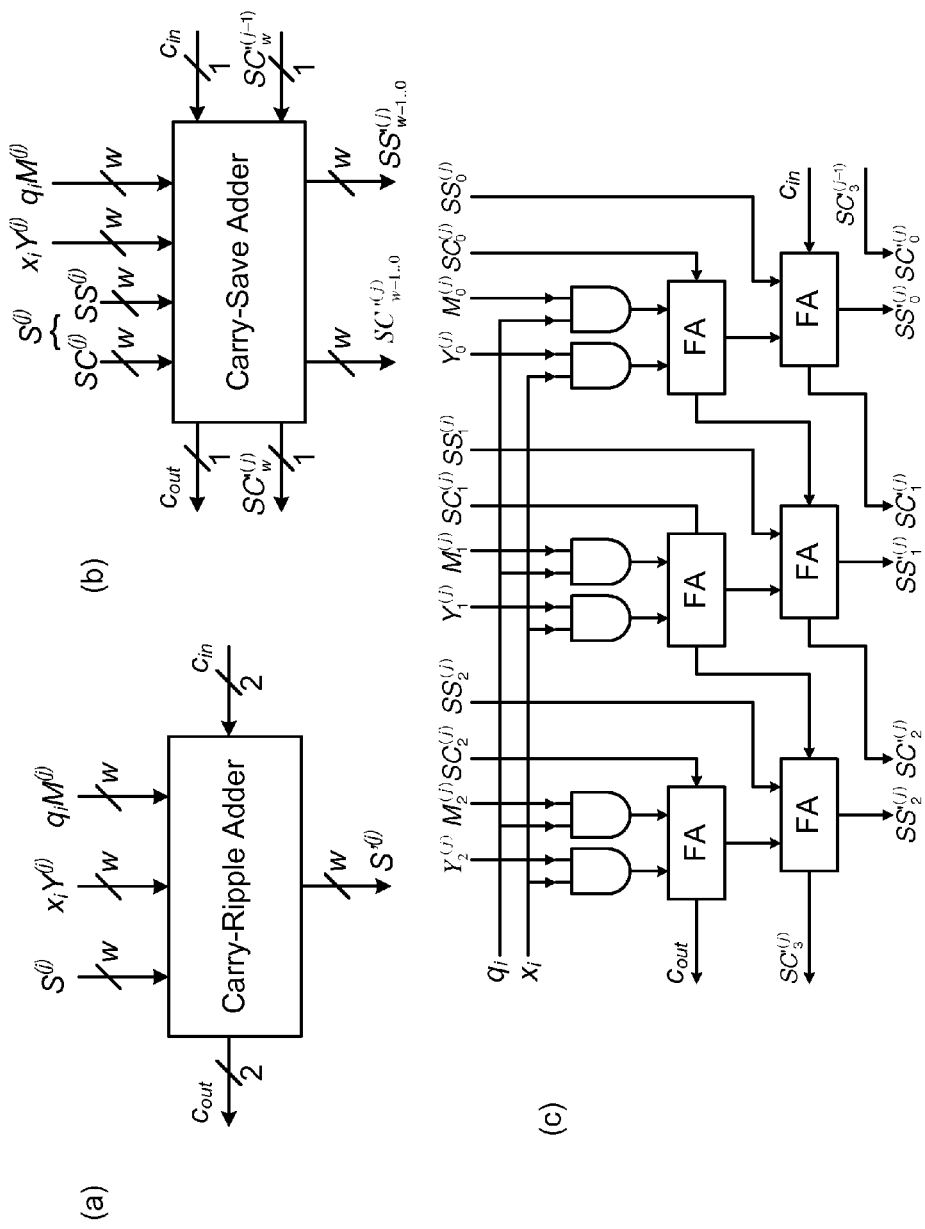
FIG. 7 shows aspects of embodiments of the present invention generating both non-redundant and redundant representation of a partial sum S.

FIGS. 7a through 7c are demonstrations of applying embodiments of disclosed technique. The embodiments of the disclosed technique could be applied onto both non-redundant and redundant representation of S. In FIG. 7a, S is represented in non-redundant form. In FIG. 7b, S is represented in redundant form. In FIG. 7c, the Logic diagram to update an S word (w=3) in redundant form. It is logically straightforward to apply the approach when S is represented in non-redundant form because each digit of S includes of only one bit. When S is represented in redundant Carry-Save (CS) form, each digit of S includes of two bits, the partial sum (SS) bit and the shift-carry (SC) bit. As shown in FIG. 7(b) and FIG. 7(c), after the update of $S^{(j)}$, only the partial sum bit of $S^{(j+1)}_0$, i.e., $SS^{(j+1)}_0$, is unknown. The shift-carry bit, $SC^{(j+1)}_0$, can be forwarded to the next PE with $S^{(j)}_{w-1\ldots 1}$. Then the same approach can be applied to update $S^{(j)}$.

Figure 8:
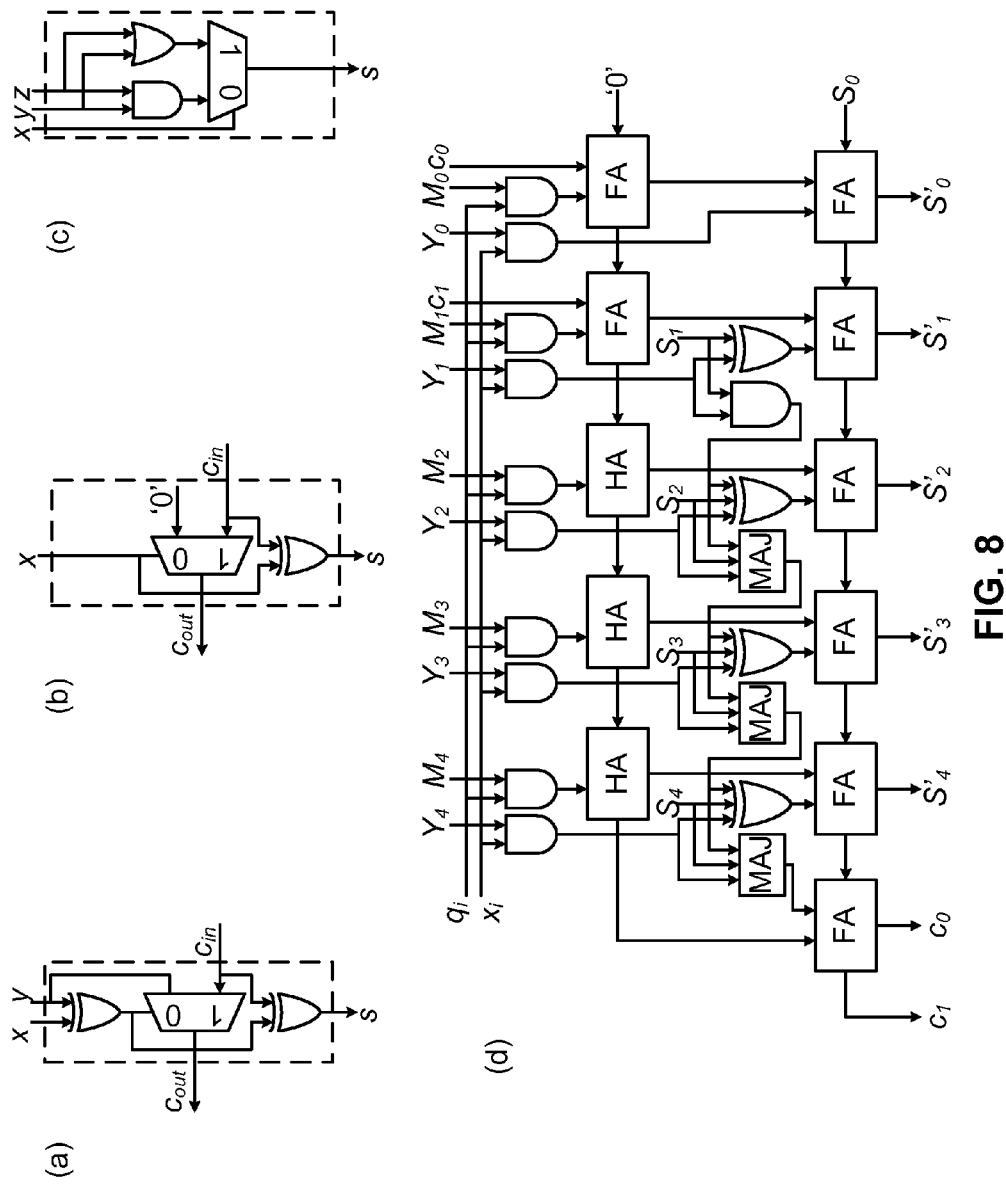
FIG. 8 illustrates aspects of embodiments of the present invention that implements $S^{(j)}+x_i \cdot Y^{(j)}+q_i \cdot M^{(j)}+C$ on a Xilinx Vitex-II FPGA device in non-redundant form.

FIGS. 8a through 8d are illustrations of an example implementation of $S^{(j)}+x_i \cdot Y^{(j)}+q_i \cdot M^{(j)}+c$ on Xilinx Vitex-II FPGA device in non-redundant form. FIG. 8a illustrates an example implementation of a Full Adder. FIG. 8b illustrates an example implementation of a Half Adder. FIG. 8c illustrates the implementation of an example MAJority logic block. And, FIG. 8d illustrates the implementation of an example Logic diagram to update an S word (w=5). Two parallel chains of FAs (Full Adders) or HAs (Half Adders) may be used to perform the 3-input addition with carry. By observing the diagram in FIG. 8(c), w+3 FAs, w−2 HAs, w−2 MAJ blocks, 2w+1 AND gates and w−1 XOR gates may be required to update an S word in non-redundant form. On the other hand, it may require 2w FAs and 2w AND gates to carry out the same operation when S is represented in redundant form, as shown in FIG. 8(c). The non-redundant form is used in this embodiment and in diagrams and specifications for the sake of simplicity. The corresponding diagrams and implementations in redundant format can be derived from the non-redundant case accordingly.

Figure 9:
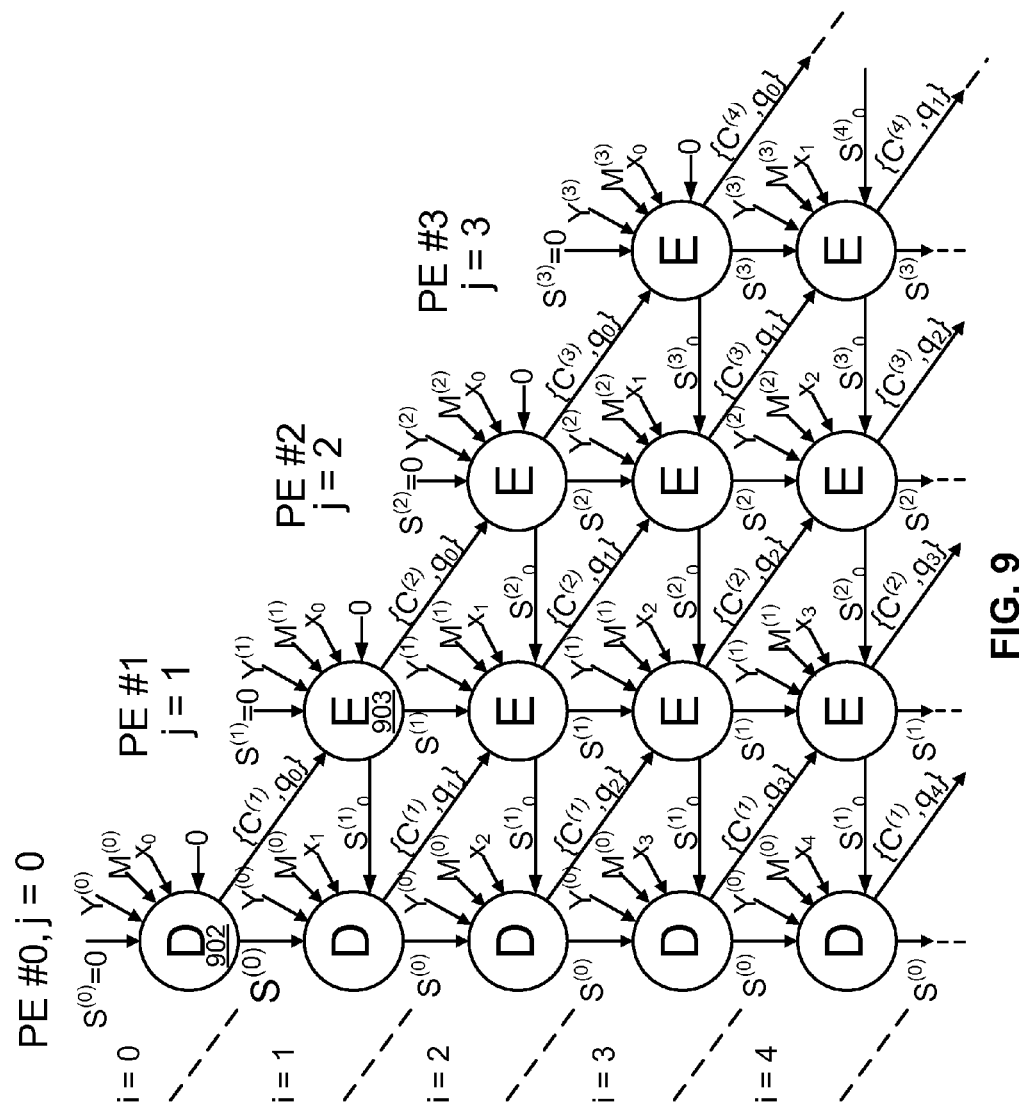
FIG. 9 is a data dependency graph of an architecture implementing a MWR2MM process as per an aspect of an embodiment of the present invention.

FIG. 9 is a data dependency graph of an example architecture for implementing MWR2MM process. The circle in the graph of FIG. 9 represents an atomic computation. Task D 902 may include of three actions, the computation of $q_i$, the calculation of two sets of possible results, and the selection between these two sets of results using an additional input $S^{(1)}_0$, which may become available at the end of the processing time for Task D 902. FIG. 11 is a pseudocode for computations in Task D 902. These three actions are shown in Process 3 in FIG. 11. FIG. 12 is a pseudocode for computations in Task E 903. Task E may include two actions. These two actions are shown in Process 4 in FIG. 12. The data forwarding of $S^{(j)}_0$ from one circle E to the circle in the left column may be used for selecting the two partial results of $S^{(j-1)}$. $S^{(j)}_{w-1\ldots 1}$ may be used for generating the two partial results of $S^{(j)}$. FIG. 13 is a pseudocode for computations in Task F.

Figure 10:
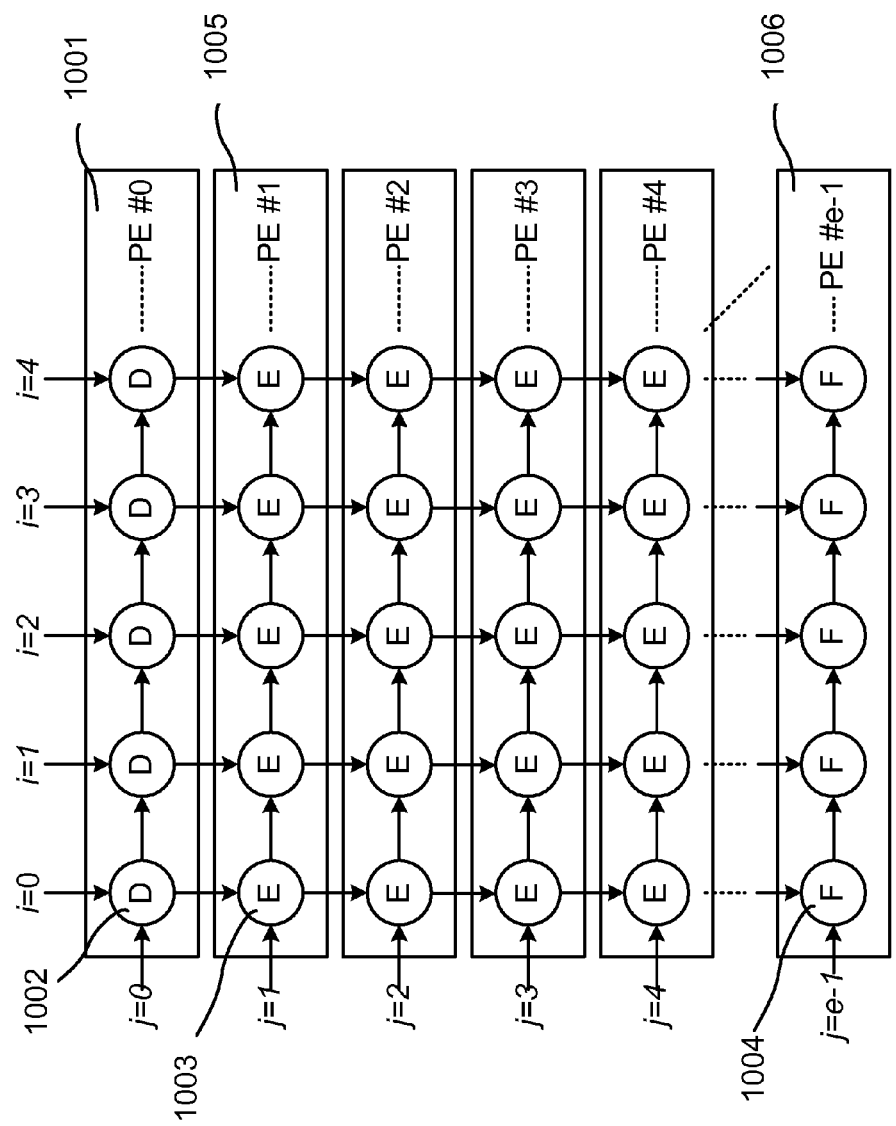
FIG. 10 is an illustration showing mapping of an MWR2MM process to processing elements as per an aspect of an embodiment of the present invention.

FIG. 10 is an illustration showing the mapping of MWR2MM process to processing elements. Each PE is responsible for only one column of the dependency graph in FIG. 9 and one Task, either D or E or F. Each column in FIG. 9 corresponds to a single iteration of j loop and covers all iterations of i loop, as shown in FIG. 10. There are e processing elements. The computation of each column in FIG. 9 can be processed by one separate PE. There is one clock cycle latency between the processing of two adjacent columns in this data dependency graph. The first processing element 1001 may perform task D 1002. The next e−2 processing elements, for example processing element 1005, may perform task E 1003. And the last processing element 1006 may perform task F 1004. Following this method, all atomic computations represented by circles in the same column in FIG. 10 could be processed concurrently.

An approach to avoiding the extra clock cycle delay due to the right shift is detailed as follows by taking Task E as an example. Each PE may first compute two versions of $C^{(j+1)}$ and $S^{(j)}_{w-1}$ simultaneously, as shown in Process 4 in FIG. 12. One version assumes that $S^{(j+1)}_0$ is equal to one, and the other assumes that this bit is equal to zero. Both results may be stored in registers. At the same moment, the bit $S^{(j+1)}_0$ becomes available and this PE can output the correct $C^{(j+1)}$ and $S^{(j)}$. For Task D, the computation of $q_j$ is performed in addition to the computation of $C^{(1)}$ and $S^{(0)}$.

Figure 14:
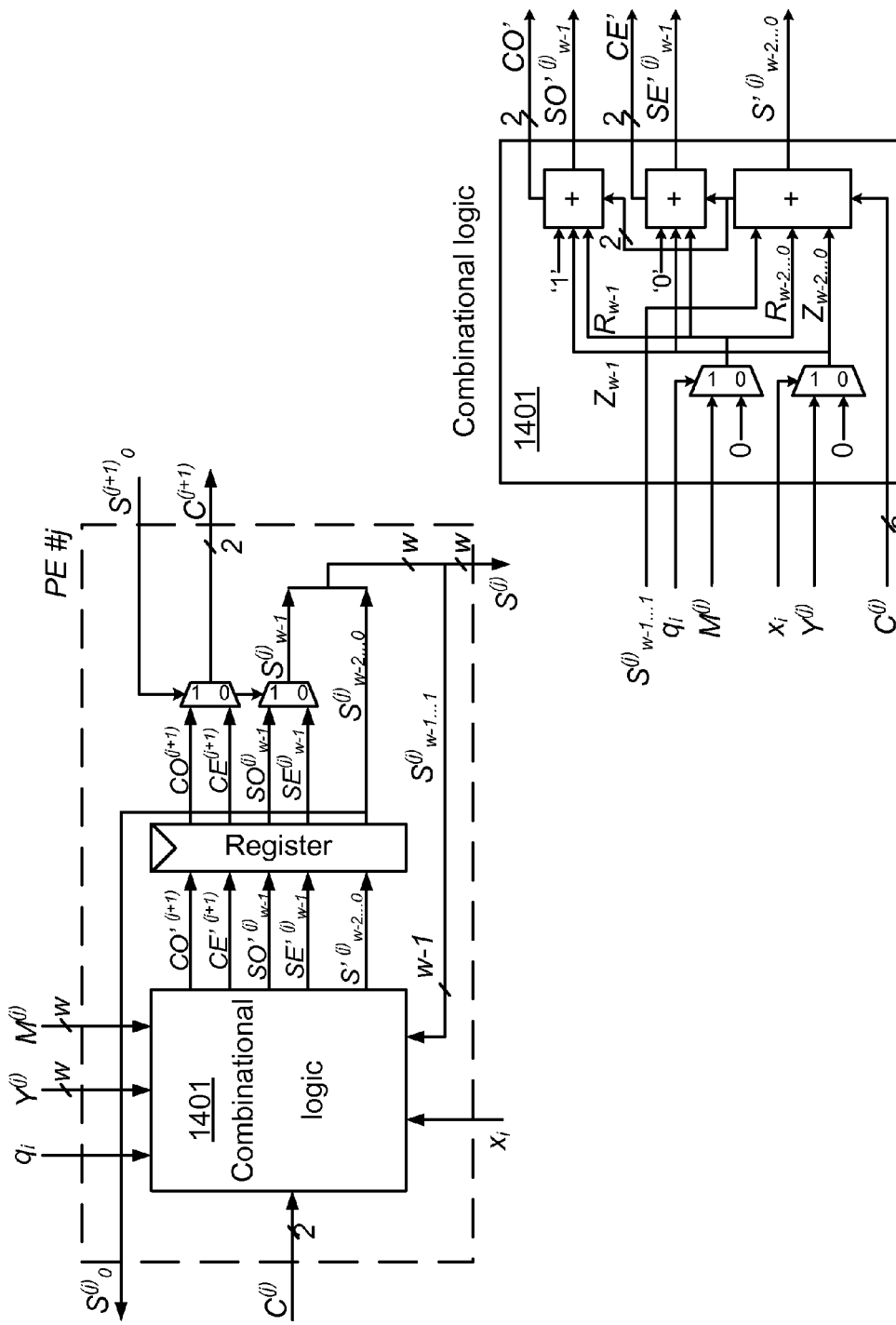
FIG. 14 is an example intermediate PE logic used in an architecture of an MWR2MM implementation as per an aspect of an embodiment of the present invention.
Figure 15:
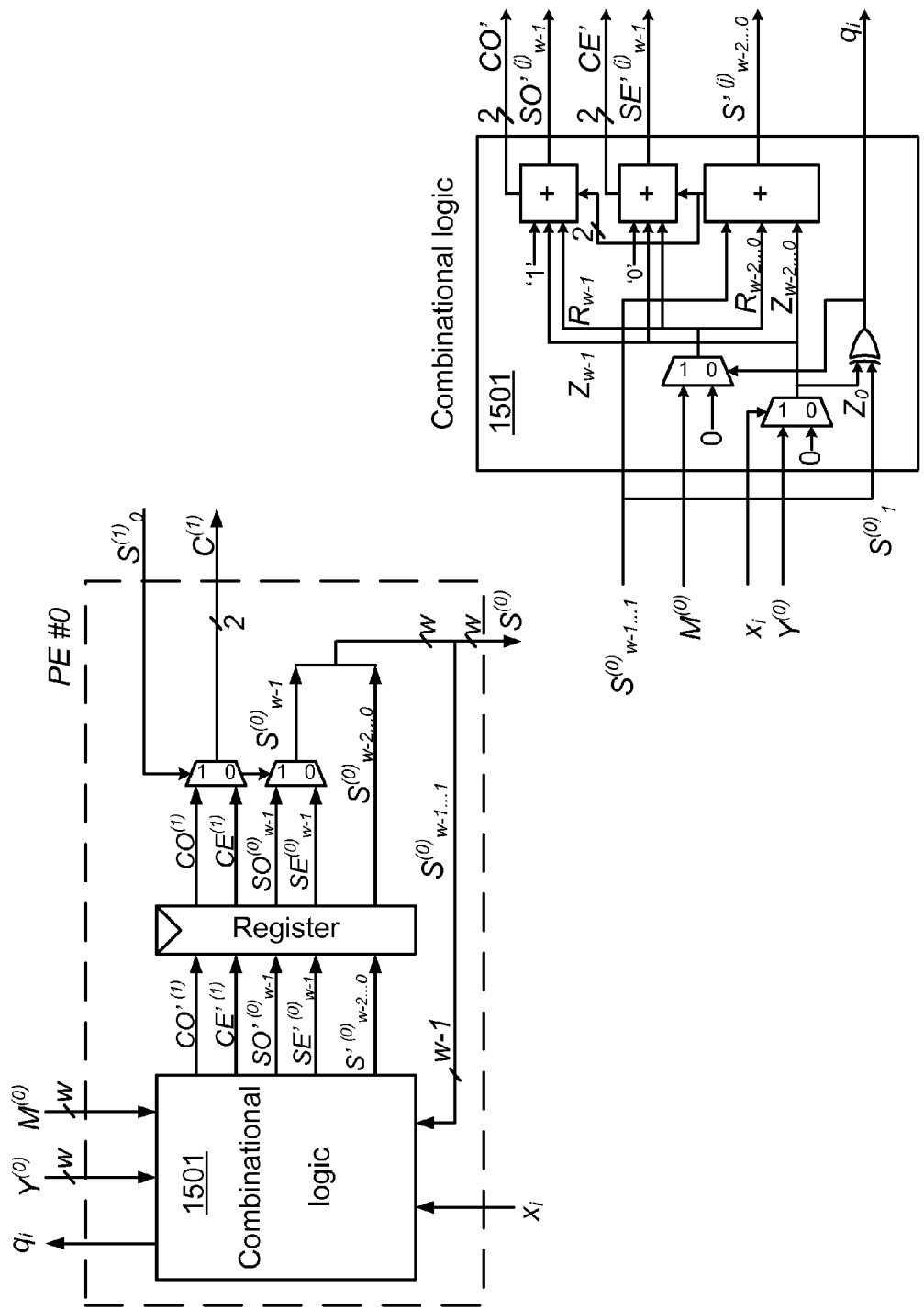
FIG. 15 is an example first PE logic used in an architecture of an MWR2MM implementation as per an aspect of an embodiment of the present invention.
Figure 16:
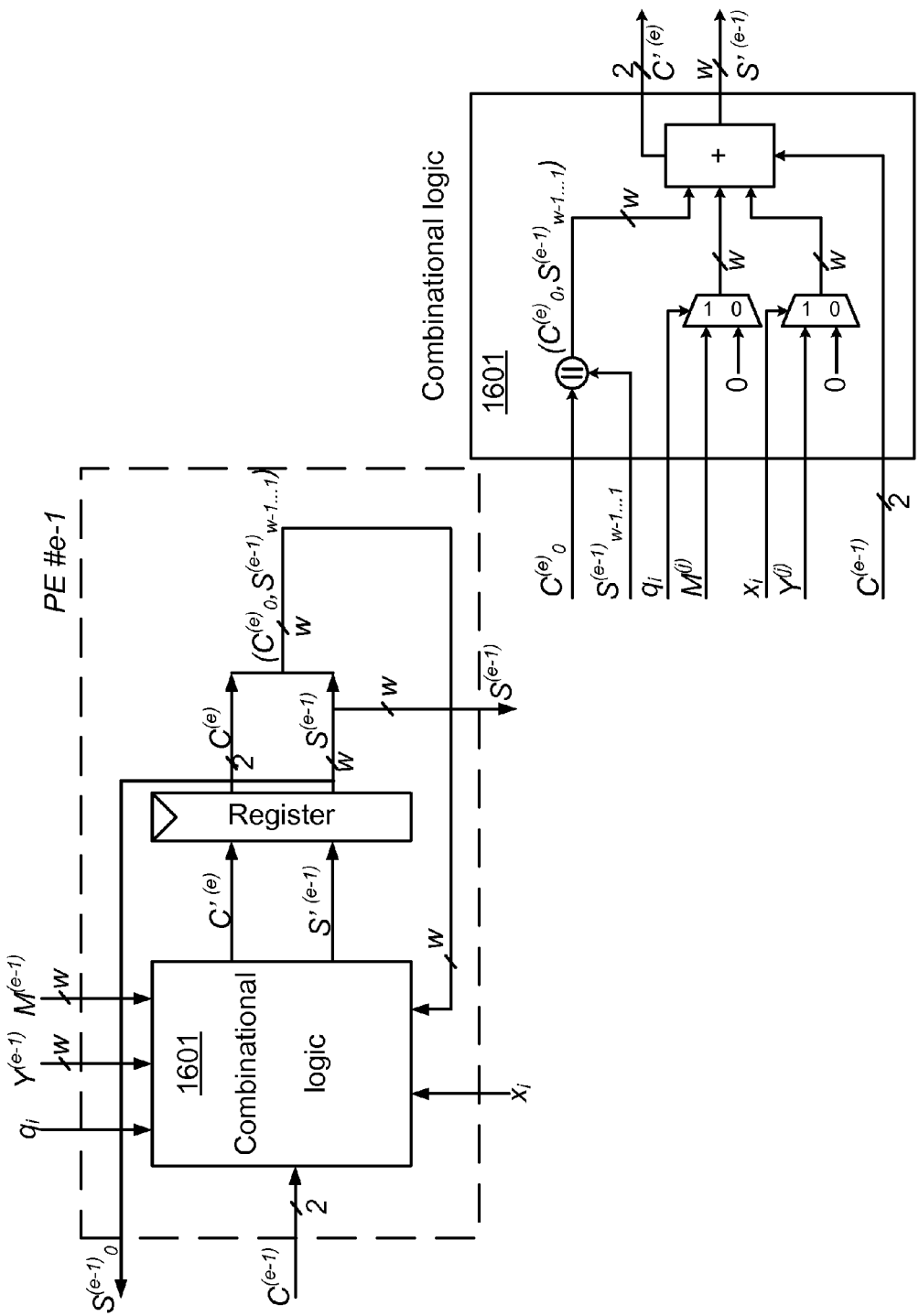
FIG. 16 is an example last PE logic used in an architecture of an MWR2MM implementation as per an aspect of an embodiment of the present invention.

FIG. 14 is an example intermediate PE logic used in the architecture of MWR2MM implementation. FIG. 15 is an example first PE logic used in the architecture of MWR2MM implementation. And FIG. 16 is an example last PE logic used in the architecture of MWR2MM implementation. The signals at the left and right sides are for the interconnection purpose. The partial sum S is fed back to the combinational logic of the same PE. The signal $x_i$ remains unchanged during the computation of a whole row in FIG. 10. Another signal, $S^{(j)}$, is only for the final output at the end of the computation of the whole multiplication.

On FPGA devices, the real implementation of the processing elements may be left to the synthesis tool for the best option in terms of trade-off between speed and area. The direct implementation of two branches (i.e., line 4.1 and 4.2 in Process 4) requires using two carry-ripple adders (Carry-ripple adders could be used when S is represented in non-redundant form. When S is represented in redundant form, carry-save adders could be used instead.), each of which includes of three w-bit inputs and a carry. It is observed that these two additions only differ in the most significant bit of the S word and share everything else. Therefore, it is desired to consolidate the shared part between these two additions into one carry-ripple adder with three w−/−bit inputs and a carry. The remaining separate parts are then carried out using two small adders. Following this implementation, the resource requirement increases only marginally while performing a redundant computation of two different cases. When S is represented in redundant form, as shown in FIG. 7c, only one additional Full Adder is required to cover two possible cases of $SS^{(j)}_{w-1}$.

Figure 17:
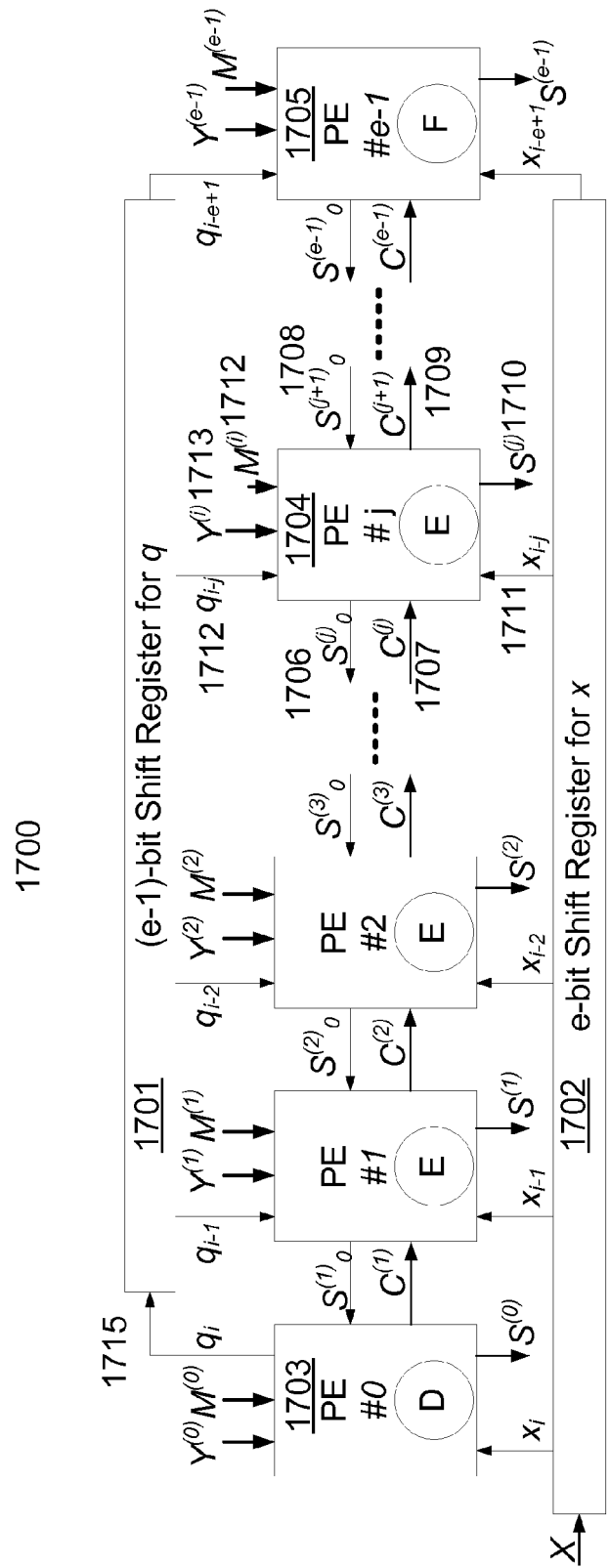
FIG. 17 is an illustration of an organization using e PEs to implement the MWR2MM process as per an aspect of an embodiment of the present invention.

The architecture keeps the scalability of the original architecture. Following the data dependency graph in FIG. 9, an alternative hardware architecture of MWR2MM process is presented in FIG. 17. FIG. 17 is an illustration of an embodiment using e PEs to implement the MWR2MM process. This architecture could finish the computation of Montgomery multiplication of n-bit precision in n+e−1 clock cycles. Furthermore, this alternative design is simpler than the previous approaches in terms of control logic and data path logic.

As shown in FIG. 17, the architecture includes of e PEs forming a computation chain. Each PE focuses on the computation of a specific word in S, i.e., PE #j 1704 only works on $S^{(j)}$. In other words, each PE corresponds to one fixed round as j in the inner loop of Process 2. Meanwhile, all PEs scan different bits of operand X at the same time. The same optimization technique is applied to avoid the extra clock cycle delay due to the right shift. The pseudocode in Process 4 describes the function and internal logic of the PE #j. The function of the combinational logic 1401, 1501 and 1601 is given by lines 4.1 and 4.2. Lines 4.3 to 4.8 are implemented using two 2-to-1 multiplexes, shown in the diagram to the right of Register.

The internal logic of all PEs is same except the two PEs residing at the head and tail of the chain. PE #0 1703, shown in FIG. 17 as the cell of type D, is also responsible for computing $q_i$ and has no $C^{(j)}$ input. This PE implements Process 3. PE #(e−1) 1705, shown in FIG. 17 as type F, has only one internal branch because the most significant bit of $S^{(e-1)}$ is equivalent to $C^{(e)}_0$, which is determined at the beginning of every clock cycle. This PE implements Process 5. Shift register 1701 parallel to PEs carries $q_i$, and do a right shift every clock cycle. Shift register 1702 parallel to PEs carry $x_i$, and do a right shift every clock cycle.

Before the start of multiplication, all registers, including the two shift registers and the internal registers of PEs, should be reset to zeros. All the bits of X will be pushed into the shift register 1702 one by one from the head and followed by zeros. The second shift register 1701 will be filled with values of $q_i$ computed by PE #0 of type D. All the registers can be enabled at the same time after the multiplication process starts because the additions of $Y^{(j)}$ and $M^{(j)}$ will be nullified by the zeros in the two shift registers before the values of $x_0$ and $q_0$ reach a given stage.

The internal register of PE #j 1704 keeps the value of $S^{(j)}$ that should be shifted one bit to the right for the next round calculation. This feature gives us two options to generate the final product.

1) The contents of $S^{(j)}_{w-1 \ldots 0}$ could be stored clock cycle by clock cycle after PE #0 finishes the calculation of the most significant bit of X, i.e., after n clock cycles, and then do a right shift on them. Or, 2) One more round of calculation could be performed right after the round with the most significant bit of X. In order to do so, one bit of "0" may be needed to be pushed into two shift registers to make sure that the additions of $Y^{(j)}$ and $M^{(j)}$ are nullified. Then the contents of $S^{(j)}_{w-1 \ldots 0}$ may be collected clock cycle by clock cycle after PE #0 finishes its extra round of calculation. These words may be concatenated to form the final product.

After the final product is generated, there are two methods to collect them. If the internal registers of PEs are disabled after the end of computation, the entire result can be read in parallel after n+e−1 clock cycles. Alternatively, the results could be read word by word in e clock cycles by connecting internal registers of PEs into a shift register chain.

The exact way of collecting the results largely depends on the application. For example, in the implementation of RSA, a parallel output would be preferred; while in the ECC computations, reading results word by word may be more appropriate.

This architecture may be extended from radix-2 to radix-4 in order to further reduce the circuit latency at the cost of increasing the product of latency times area. The concepts illustrated in FIG. 9 may be adopted to design high-radix hardware architecture of Montgomery multiplication. Instead of scanning one bit of X every time, several bits of X could be scanned together for high-radix cases. Assuming k bits of X are scanned at one time, $2^k$ branches should be covered at the same time to maximize the performance. Considering the value of $2^k$ increases exponentially as k increments, the design becomes more complicated beyond radix-4.

FIG. 18 is a pseudocode for multiple-word Radix-4 Montgomery Multiplication process. Following the same definitions regarding words as in Process 2, the radix-4 version of Montgomery multiplication is shown as Process 6. Two bits of X may be scanned in one action this time instead of one bit as in Process 2. While reaching the maximal parallelism, the radix-4 version design takes n/2+e−1 clock cycles to process n-bit Montgomery multiplication.

The carry variable C has 3 bits, which can be proven in a similar way to the proof of the radix-2 case. The value of $q^{(i)}$ at line 6.3 of Process 6 is defined by a function involving $S^{(0)}_{1 \ldots 0}$, $x^{(i)}$, $Y^{(0)}_{1 \ldots 0}$ and ($M^{(0)}_{1 \ldots 0}$ so that (8) is satisfied.

$$S_{1 \ldots 0}^{(0)} + x^{(i)} \cdot Y_{1 \ldots 0}^{(0)} + q^{(i)} \cdot M_{1 \ldots 0}^{(0)} = 0 \pmod 4 \tag{8}$$

Since M is odd, $M^{(0)}_0 = 1$. From (8), it could be derived $$q_0^{(i)} = S_0^{(i)} \oplus (x_0^{(i)} \cdot Y_0^{(0)}) \tag{9}$$

where $x^{(i)}_0$ and $q^{(i)}_0$ denote the least significant bit of $x^{(i)}$ and $q^{(i)}$ respectively. The bit $q^{(i)}_1$ is a function of only seven one-bit variables and can be computed using a relatively small look-up table.

The multiplication by 3, which may be needed to compute $x^{(i)} \cdot Y^{(j)}$ and $q^{(i)} \cdot M^{(j)}$, could be done on the fly or avoided by using Booth recoding. Using the Booth recoding would require adjusting the process and architecture to deal with signed operands.

Furthermore, Process 6 could be generalized to handle MWR2kMM process. In general, $x^{(i)}$ and $q^{(i)}$ are both k-bit variables. $x^{(i)}$ is a k-bit digit of X, and $q^{(i)}$ is defined by (10).

$$S^{(0)} + x^{(i)} \cdot Y^{(0)} + q^{(i)} \cdot M^{(0)} = 0 \pmod {2^k} \tag{10}$$

Nevertheless, the implementation of the proposed optimization for the case of k>2 would be more complicated.

Hardware Implementation of an Embodiment

The architecture has been fully verified by modeling them using Verilog-HDL, and comparing their function vs. reference software implementation of Montgomery multiplication based on the GMP library. The code has been implemented on Xilinx Virtex-II 6000 FPGA and experimentally tested on SRC-6 reconfigurable computer. The architecture is easily parameterizable, so the same generic code with different values of parameters can be easily used for multiple operand and word sizes.

The architecture is scalable in terms of the value of the word size w. The larger w is, the smaller the maximum clock frequency will be. The latency expressed in the number of clock cycles is equal to $n+\lceil((n+1)/w\rceil-1$, and is almost independent of w for $w \geq 16$. Since actual FPGA-based platforms, such as SRC-6 used in the implementations, have a fixed target clock frequency, this target clock frequency determines the optimum value of w. Additionally, the same HDL code can be used for different values of the operand size n and the parameter w, with only a minor change in the values of respective constants.

The architecture has been implemented in Verilog HDL, and its codes have been verified using reference software implementation. The results completely matched. Xilinx Virtex-I6000FF1517-4 FPGA device used in the SRC-6 reconfigurable computer has been selected for the prototype implementations. The synthesis tool has been Synplify Pro 9.1 and the Place and Route tool has been Xilinx ISE 9.1.

The word size w is fixed at 16-bit for most of the architectures implementing the MWR2MM process. Moreover, the 32-bit case of Architecture 2 is tested as well to show the trade-off among clock rate, minimum latency and area. The present embodiment can be implemented for any desired word size. In order to maximize the performance, the maximum number of PEs in the implementation of architecture is used. S is represented in non-redundant form. In other words, carry-ripple adders are used in the implementation.

Figure 19:
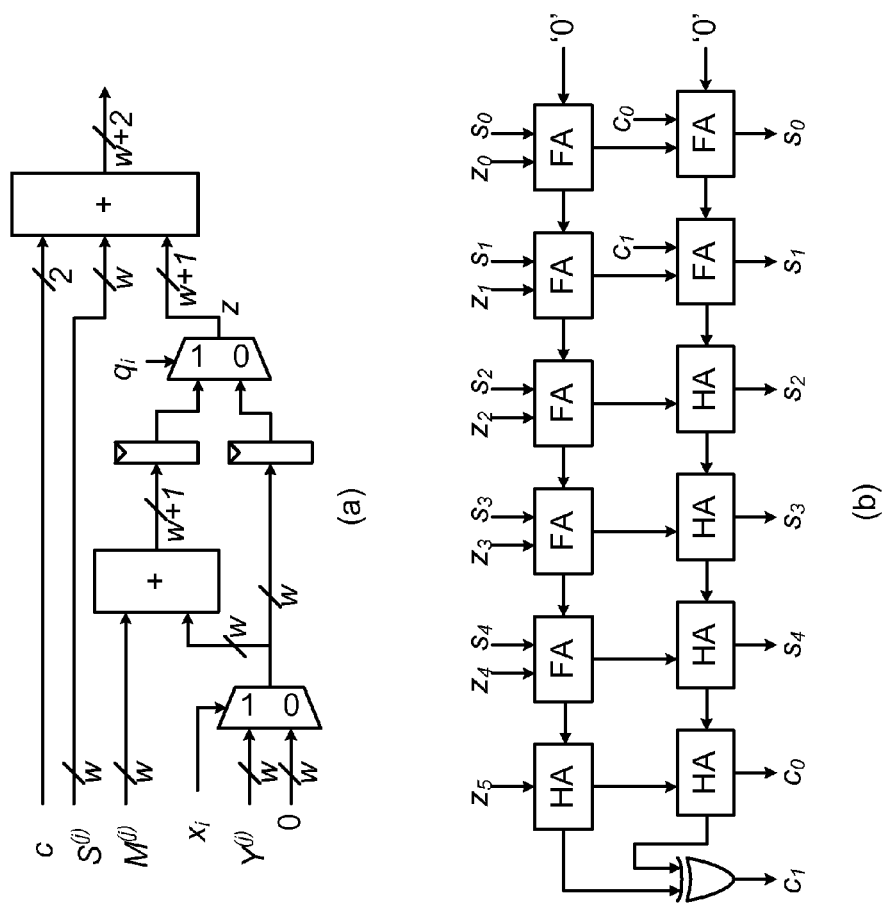
FIG. 19 shows illustrations of an architecture for distribute computation of $c+S^{(j)}+x_i \cdot Y^{(j)}+q_i \cdot M^{(j)}$ as per an aspect of an embodiment of the present invention.

FIG. 19a and FIG. 19b are illustrations of an architecture for distribute computation of $c+S^{(j)}+x_i \cdot Y^{(j)}+q_i \cdot M^{(j)}$. In order to minimize the critic path delay in the carryripple addition of $c+S^{(j)}+x_i \cdot Y^{(j)}+q_i \cdot M^{(j)}$, this 3-input addition with carry is broken into two 2-input additions. FIG. 19a illustrates the logic diagram. As shown in FIG. 19a, $x_i \cdot Y^{(j)}+M^{(j)}$ may be precomputed one clock cycle ahead of its addition with $S^{(j)}$. This technique may be applied to the implementation to maximize the frequency. This design point is appropriate when the target device is an FPGA device with abundant hardware resources. When area constraint is of high priority, or S is represented in redundant form, this frequency-oriented technique may become unnecessary.

FIG. 19b illustrates the implementation of $S_{w-1 \ldots 0}+Z_{w \ldots 0}+C_{1 \ldots 0}$ on Xilinx Virtex-II FPGA device, $w=5$ ($Z_{w \ldots 0}=x_i \cdot Y_{w-1 \ldots 0}+q_i \cdot M_{w-1 \ldots 0}$). The real implementation of the second 2-input addition with carry on Xilinx Virtex-II device is shown in FIG. 19b w+2 full adders (FAs) and w half adders (HAs) form two parallel chains to perform the addition. Consider the w FAs used in the first addition, the implementation of the logic in FIG. 19a may require 3w+2 FAs or HAs. Compared with the 2w FAs used in FIG. 7c, the non-redundant implementation of Montgomery multiplication may consume approximately 50% more hardware resources than the implementation in redundant form on Xilinx Virtex-II platform.

The architecture (radix-2 and w=16) gives a speedup by a factor of almost two compared with the architecture by Tenca and Koc, in terms of latency expressed in the number of clock cycles. The minimum clock period is comparable in both cases and extra propagation delay in using architecture of this embodiment is introduced only by the multiplexers directly following the Registers, as shown in FIG. 17.

The time between two consecutive Montgomery multiplications could be further reduced by overlapping computations for two consecutive sets of operands. In the original architecture by Tenca and Koc., this repetition interval is equal to 2n clock cycles, and in all other investigated architectures n clock cycles.

For radix-4 case, four different precisions, 1024, 2048, 3072, and 4096, of Montgomery multipliers have been implemented. The word-length is the same as the one in the radix-2 case, i.e., 16 bits. For all four cases, the maximum frequency is comparable for both radix-2 and radix-4 designs. Moreover, the minimum latency of the radix-4 designs is almost half of the radix-2 designs. In the meantime, the radix-4 designs occupy more than twice as many resources as the radix-2 versions. These figures fall within expectations because radix-4 PE has 4 internal branches, which doubles the quantity of branches of radix-2 version, and some small design tweaks and optimizations are required to redeem the propagation delay increase caused by more complicated combinational logic. Some of these optimization techniques are listed below, 1) At line 6.6 of Process 6 there is an addition of three operands whose length is w-bit or larger. To reduce the propagation delay of this action, the value of $x^{(i)} \cdot Y^{(j)}+q^{(i)} \cdot M^{(j)}$ may be precomputed one clock cycle before it arrives at the corresponding PE.

2) For the first PE in which the update of $S^{(0)}$ and the evaluation of $q^{(i)}$ happen in the same clock cycle, the value of $x^{(i)} \cdot Y^{(0)}+q^{(i)} \cdot M^{(0)}$ may not be precompute in advance. Four possible values of $x^{(i)} \cdot Y^{(0)}+q^{(i)} \cdot M^{(0)}$ are precomputed corresponding to $q^{(i)}=0, 1, 2, 3$, and a decision may be made at the end of the clock cycle based on the real value of $q^{(i)}$.

The hardware implementation of the design beyond radix-4 may be more complicated considering the large resource cost for covering all the $2^k$ branches in one clock cycle, and the need to perform multiplications of words by numbers in the range $0 \ldots 2^k-1$.

The architecture preserves the scalability of the original design by Tenca and Koc. Further it outperforms Tenca-Koc, design by about 23% in terms of the product of latency times area when implemented on Xilinx Virtex-II 6000 FPGA.

The architecture introduces a novel data dependency graph, aimed at significantly simplifying the control unit of each Processing Element. It breaks with the scalability of the original scheme in favor of optimizing the design for the case of minimum latency. This architecture outperforms the original design by Tenca and Koc, by 50% in terms of the product latency times area for four most popular operand sizes used in cryptography (1024, 2048, 3072 and 4096 bits).

It should be noted that references to "an" embodiment in this disclosure are not necessarily to the same embodiment, and they mean at least one. In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "action for" be interpreted under 35 U.S.C. 112, paragraph 6. Claims that do not expressly include the phrase "means for" or "action for" are not to be interpreted under 35 U.S.C. 112, paragraph 6.

What is claimed is:

1. A Montgomery multiplication process for obtaining a Montgomery product of a first operand X and a second operand Y with respect to a modulus M in a Montgomery multiplication device having a plurality of processing elements which are interconnected in sequence, said Montgomery multiplication process comprising:
   a) selecting a word length w and a number of words e;
   b) scanning said second operand Y and said modulus M as e words of length w, wherein e is at least 2;
   c) scanning said first operand X as n bits;
   d) in a first clock cycle of at least one of said plurality of processing elements:
      (1) creating a first intermediate partial sum of length w by:
         (a) obtaining a parameter of length w−1 precalculated in said at least one of said plurality of processing elements as w−1 least significant bits of said first intermediate partial sum; and
         (b) configuring the most significant bit of said first intermediate partial sum as zero;
      (2) creating a second intermediate partial sum by:
         (a) obtaining said parameter as the w−1 least significant bits of said second intermediate partial sum; and
         (b) configuring the most significant bit of said second intermediate partial sum as one;
      (3) calculating a first partial sum bits using at least:
         (a) a word of said second operand Y;
         (b) a word of said modulus M;
         (c) a bit of said first operand X; and
         (d) said first intermediate partial sum;
      (4) calculating a second partial sum bits using at least:
         (a) a word of said second operand Y;
         (b) a word of said modulus M;
         (c) a bit of said first operand X; and
         (d) said second intermediate partial sum; and
   e) in a second clock cycle of at least one of said plurality of processing elements:
      i) obtaining a selection bit from a subsequent processing element in said plurality of processing elements;
      ii) selecting either said first partial sum or said second partial sum as a selected partial sum based on the value of said selection bit; and
      iii) using said selected partial sum for calculation of a word of said Montgomery product.

2. The process of claim 1, wherein the selection bit is the least significant bit of a partial sum calculated in said subsequent processing element.

3. The process of claim 1, wherein:
   a) said first operand X is n bits;
   b) said second operand Y is n bits;
   c) said modulus M is n bits; and
   d)

$$e = \left\lceil \frac{n+1}{w} \right\rceil.$$

4. The process of claim 1, wherein said Montgomery product is calculated iteratively.

5. The process of claim 1, wherein said first operand X is processed iteratively bit-by-bit.

6. The process of claim 1, wherein said second operand Y is processed iteratively word-by-word.

7. The process of claim 1, wherein calculating said first partial sum further includes a one-bit carrier or a two-bit carrier.

8. The process of claim 1, wherein said processing element is one of the following:
   a) a first processing element;
   b) an intermediate processing element; and
   c) a last processing element.

9. The process of claim 1, wherein each word of the said Montgomery product is calculated by one of the following:
   a) a first processing element;
   b) an intermediate processing element; and
   c) a last processing element.

* * * * *